United States Patent
Kouno et al.

(10) Patent No.: US 8,738,179 B2
(45) Date of Patent: May 27, 2014

(54) ROBOT SYSTEM

(75) Inventors: Dai Kouno, Kitakyushu (JP); Takashi Nishimura, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 925 days.

(21) Appl. No.: 12/625,513

(22) Filed: Nov. 24, 2009

(65) Prior Publication Data

US 2010/0138042 A1    Jun. 3, 2010

(30) Foreign Application Priority Data

Dec. 1, 2008  (JP) ................................. 2008-305852
Mar. 3, 2009  (JP) ................................. 2009-049352
Jun. 18, 2009 (JP) ................................. 2009-144965

(51) Int. Cl.
  *G05B 11/00*  (2006.01)

(52) U.S. Cl.
  USPC ............................................ 700/259; 901/3

(58) Field of Classification Search
  USPC ............. 700/259, 183, 245, 180, 83, 97, 250,
      700/253, 257; 701/23–25; 318/567, 568.1,
      318/568.12–568.16; 901/3, 10, 46, 47
  See application file for complete search history.

(56) References Cited

U.S. PATENT DOCUMENTS

| | | | | |
|---|---|---|---|---|
| 5,155,684 A | * | 10/1992 | Burke et al. | 701/25 |
| 5,572,102 A | * | 11/1996 | Goodfellow et al. | 318/568.13 |
| 6,454,036 B1 | * | 9/2002 | Airey et al. | 180/167 |
| 2009/0234501 A1 | * | 9/2009 | Ishizaki | 700/259 |

FOREIGN PATENT DOCUMENTS

| | | |
|---|---|---|
| JP | 60-093523 | 5/1985 |
| JP | 07-175520 | 7/1995 |
| JP | 2002-296010 | 10/2002 |
| JP | 2006-155195 | 6/2006 |
| JP | 2008-012636 | 1/2008 |
| JP | 2008-028614 | 2/2008 |
| JP | 2008-146197 | 6/2008 |

OTHER PUBLICATIONS

Japanese Office Action for corresponding JP Application No. 2009-049352, Nov. 20, 2012.
Japanese Office Action for corresponding JP Application No. 2009-144965, Feb. 26, 2013.

* cited by examiner

*Primary Examiner* — Dalena Tran
(74) *Attorney, Agent, or Firm* — Ditthavong Mori & Steiner, P.C.

(57) ABSTRACT

Teaching images are acquired at a plurality of separate teaching points on a running route extending from a running start position to a goal position, respectively, under a first light environmental condition and a light environmental condition different from the first light environmental condition, and the teaching images are stored. A present teaching image serving as a target for a robot body in a running direction at present is selected from the stored teaching images. A driving mechanism is controlled so as to increase the matching degree between the present teaching image and an actual image taken by a camera.

16 Claims, 17 Drawing Sheets

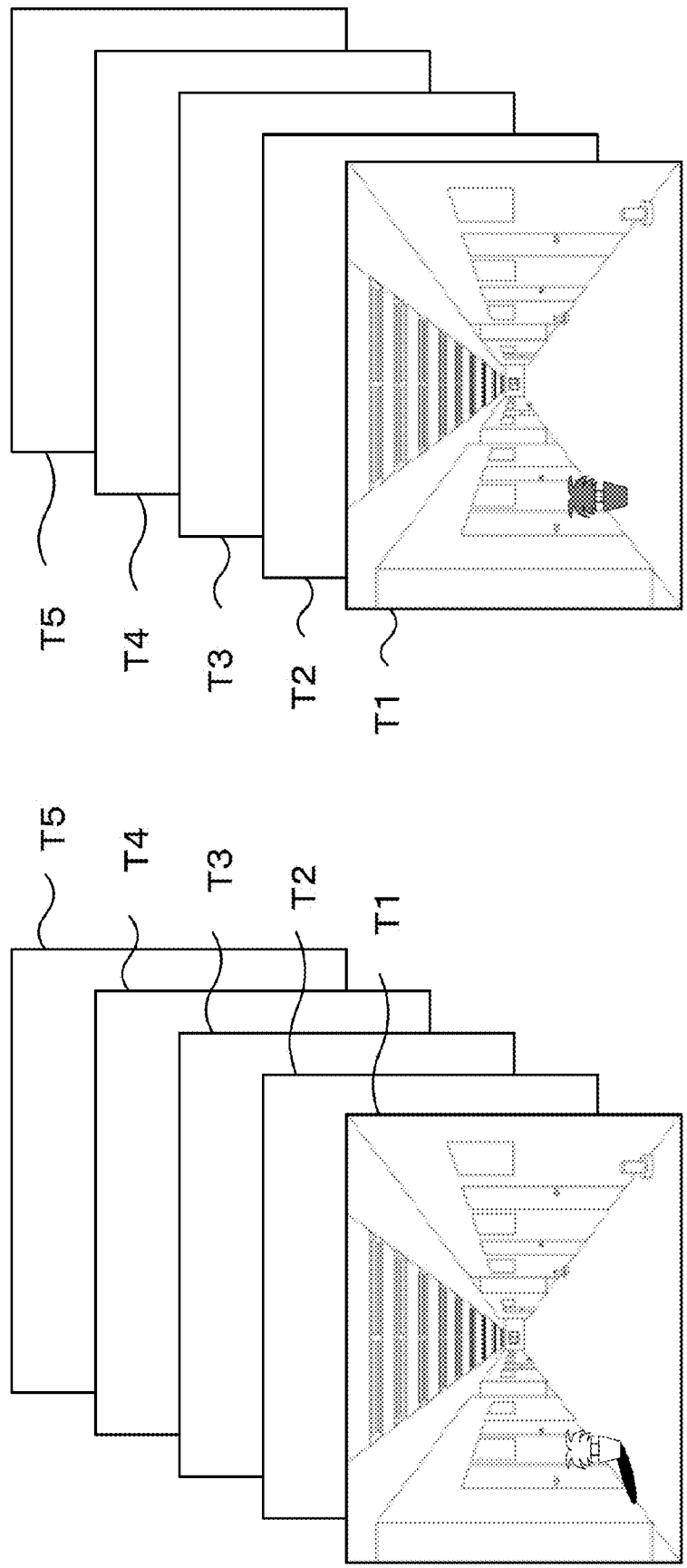

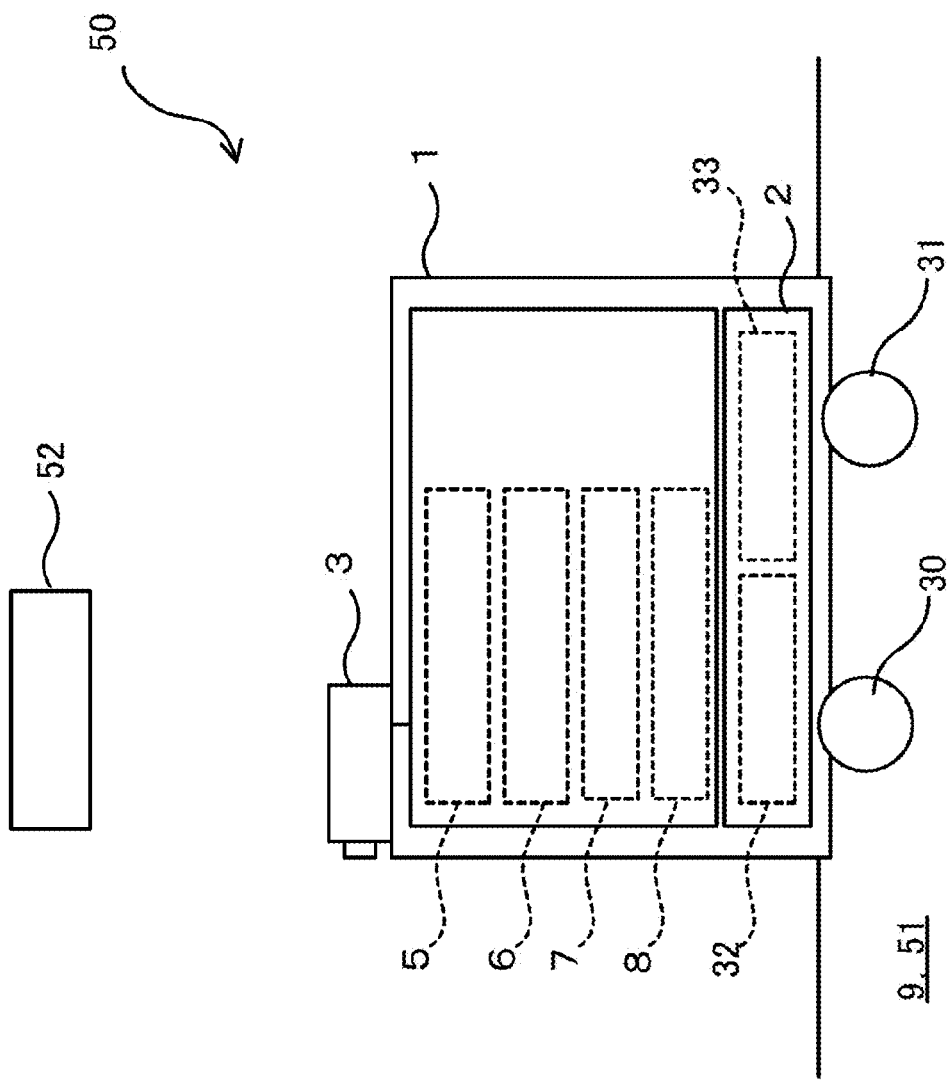

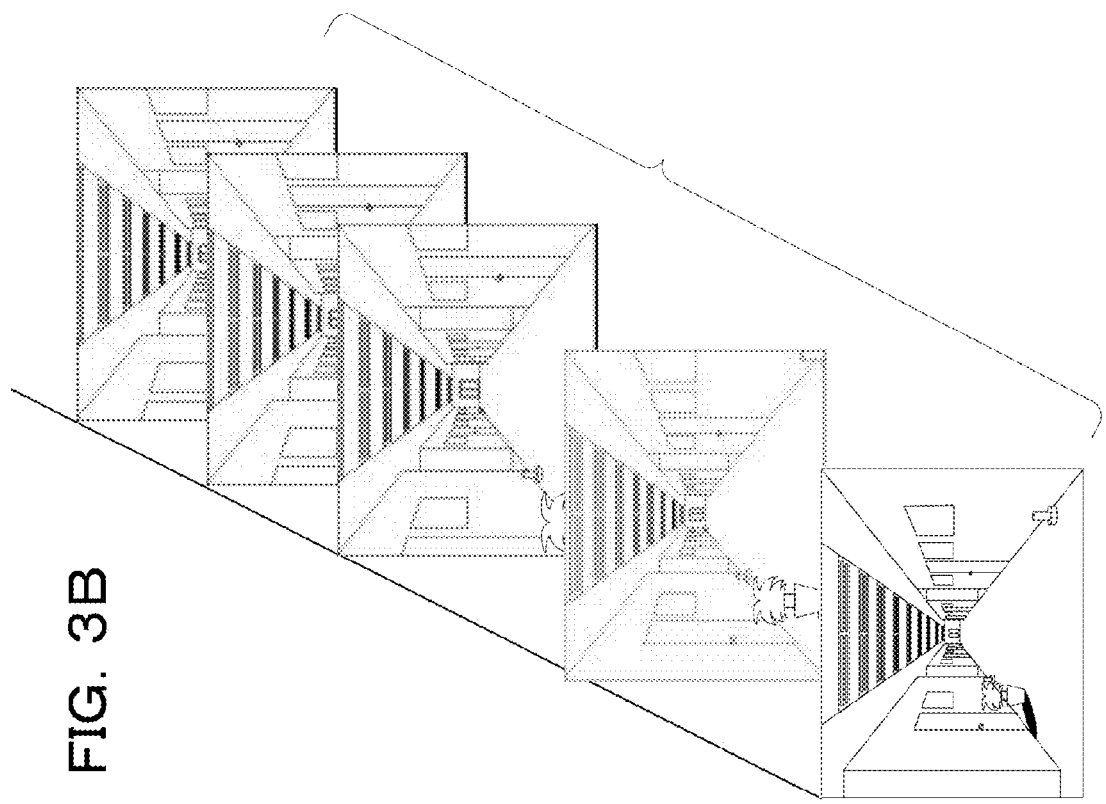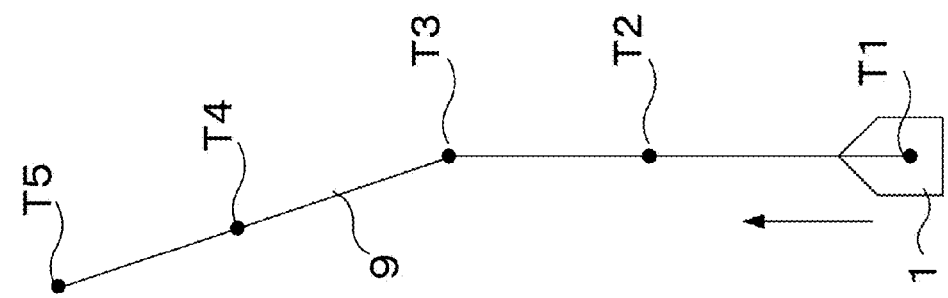

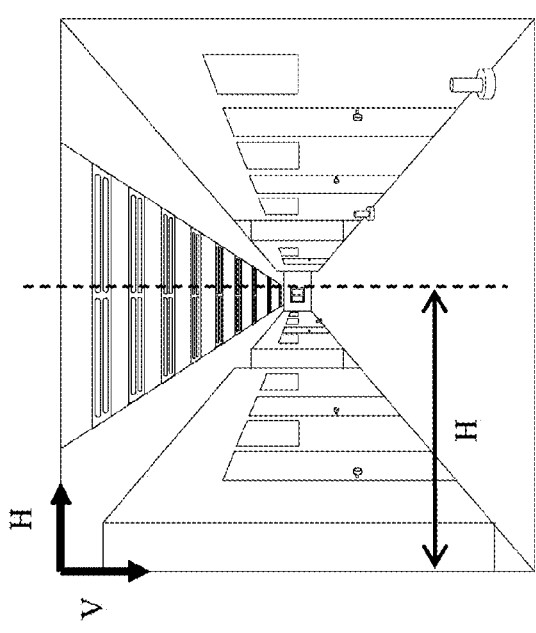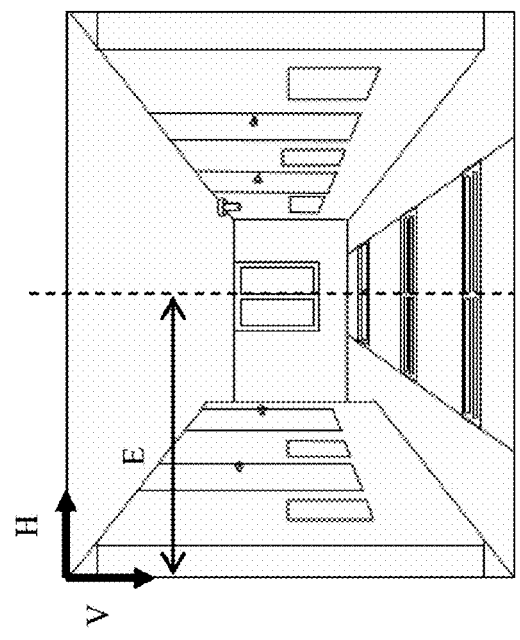
FIG. 13A
FIG. 13B

FIG. 16
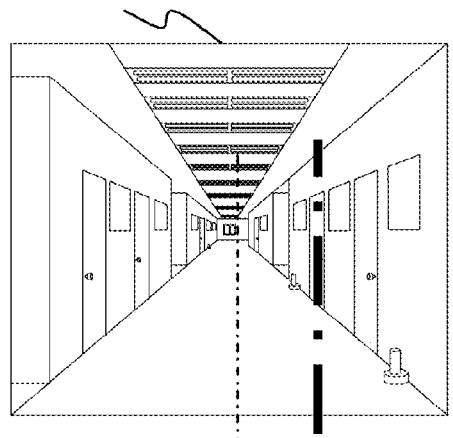
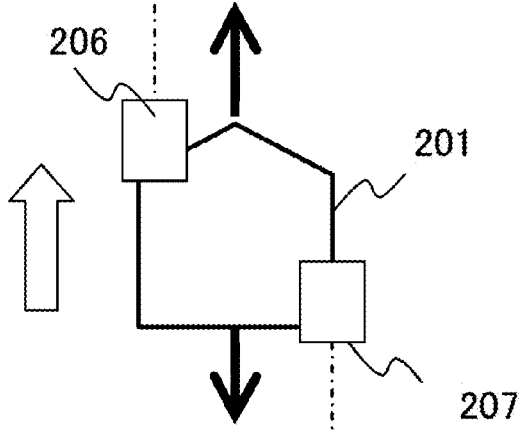
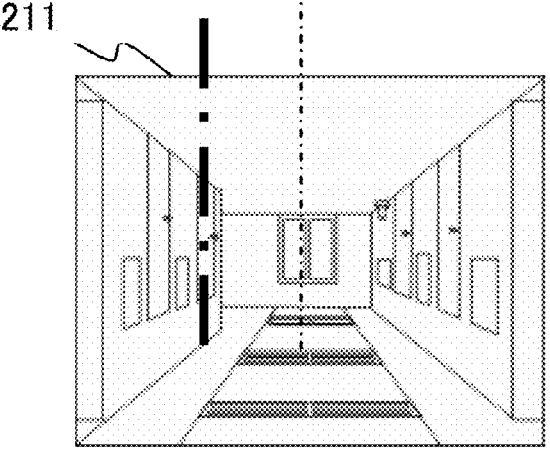

FIG. 17
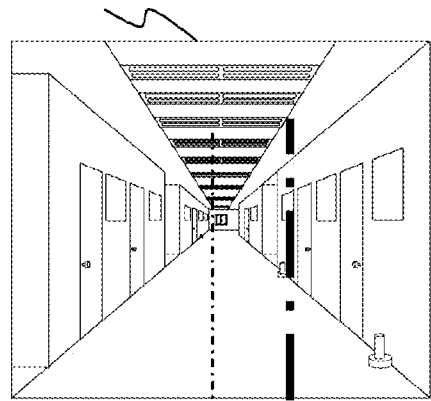
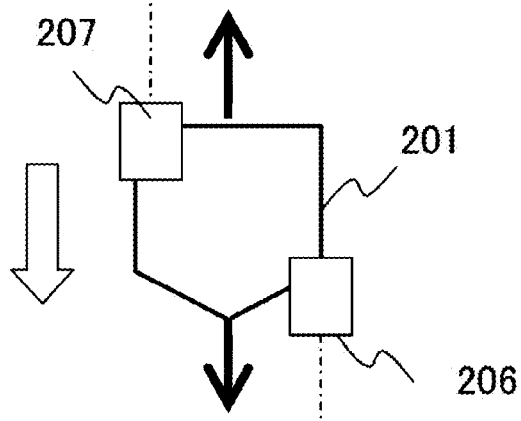
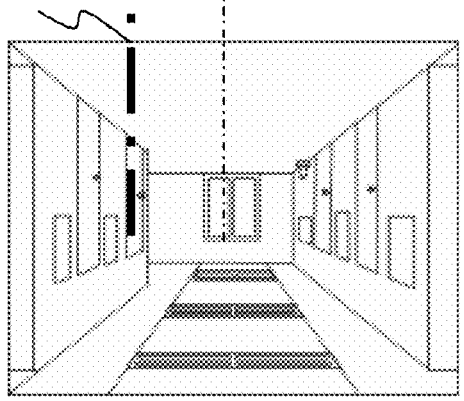

ROBOT SYSTEM

CROSS-REFERENCE TO RELATED APPLICATION

The present application relates to Japanese Patent Application No. 2009-049352, filed Mar. 3, 2009, entitled "Robot", and to Japanese Patent Application No. 2008-305852, filed Dec. 1, 2008, entitled "Controller for Robot and Robot System" and Japanese Patent Application No. 2009-144965, filed Jun. 18, 2009, entitled "Controller for Robot and Robot System" all of which are incorporated herein by reference in their entirety.

BACKGROUND OF THE INVENTION

1. Field of the Invention

The present invention relates to a robot system.

2. Description of the Related Art

In production plants, a robot capable of autonomous running is used to carry products and components for the purpose of laborsaving (e.g., see Japanese Patent Laid-Open Publication No. 2008-146197). The contents of these patent publications are incorporated herein by reference in their entirety.

SUMMARY OF THE INVENTION

According to one aspect of the present invention, a robot system includes a robot body configured to run along a running route; a driving mechanism configured to drive the robot body in a front-rear direction and a turning direction; a driving control device mounted in the robot body and configured to control the driving mechanism; and a camera mounted in the robot body and configured to take an actual image. The driving control device includes a teaching-image storage unit configured to store teaching images acquired at a plurality of separate teaching points on the running route from a running start position to a goal position under a first light environmental condition, and teaching images acquired at the plurality of separate teaching points on the running route under a light environmental condition different from the first light environmental condition; a teaching-image selection unit configured to select a present teaching image from the teaching images stored in the teaching-image storage unit, the present teaching image being a target for the robot body in a running direction at present; and a running control unit configured to control the driving mechanism so as to increase a matching degree between the present teaching image selected by the teaching-image selection unit and the actual image taken by the camera.

According to another aspect of the present invention, a robot system includes a robot body configured to run along a running route; a driving mechanism configured to drive the robot body in a front-rear direction and a turning direction; a driving control device mounted in the robot body and configured to control the driving mechanism; a first camera mounted in the robot body and configured to take an actual image of front; and a second camera mounted in the robot body and configured to take an actual image of rear. The driving control device includes a teaching-image storage unit configured to store teaching images including image data acquired beforehand along the running route at a plurality of separate teaching points on the running route; and a running control unit configured to control the driving mechanism so that the robot body runs along the running route, on the basis of results of comparison between the teaching images stored in the teaching-image storage unit, and a first acquired image taken by the first camera and a second acquired image taken by the second camera.

BRIEF DESCRIPTION OF THE DRAWINGS

The present invention will be described in further detail with reference to the accompanying drawings wherein:

FIG. 1A schematically shows examples of teaching images stored in a teaching-image storage unit in a first embodiment;

FIG. 1B schematically shows examples of teaching images stored in the teaching-image storage unit in the first embodiment;

FIG. 2 schematically shows an overall configuration of a robot system according to the first embodiment;

FIG. 3A schematically shows teaching points in the first embodiment;

FIG. 3B shows examples of teaching images corresponding to the teaching points;

FIG. 13A shows an image taken in the state shown in FIG. 12;

FIG. 13B shows an image taken in the state shown in FIG. 12;

FIG. 16 shows a state in which a robot of a modification of the second embodiment moves in one direction; and FIG. 17 shows a state in which the robot of the modification moves in a direction opposite the direction of FIG. 16.

DETAILED DESCRIPTION OF THE PREFERRED EMBODIMENTS

First Embodiment

Figure 4:
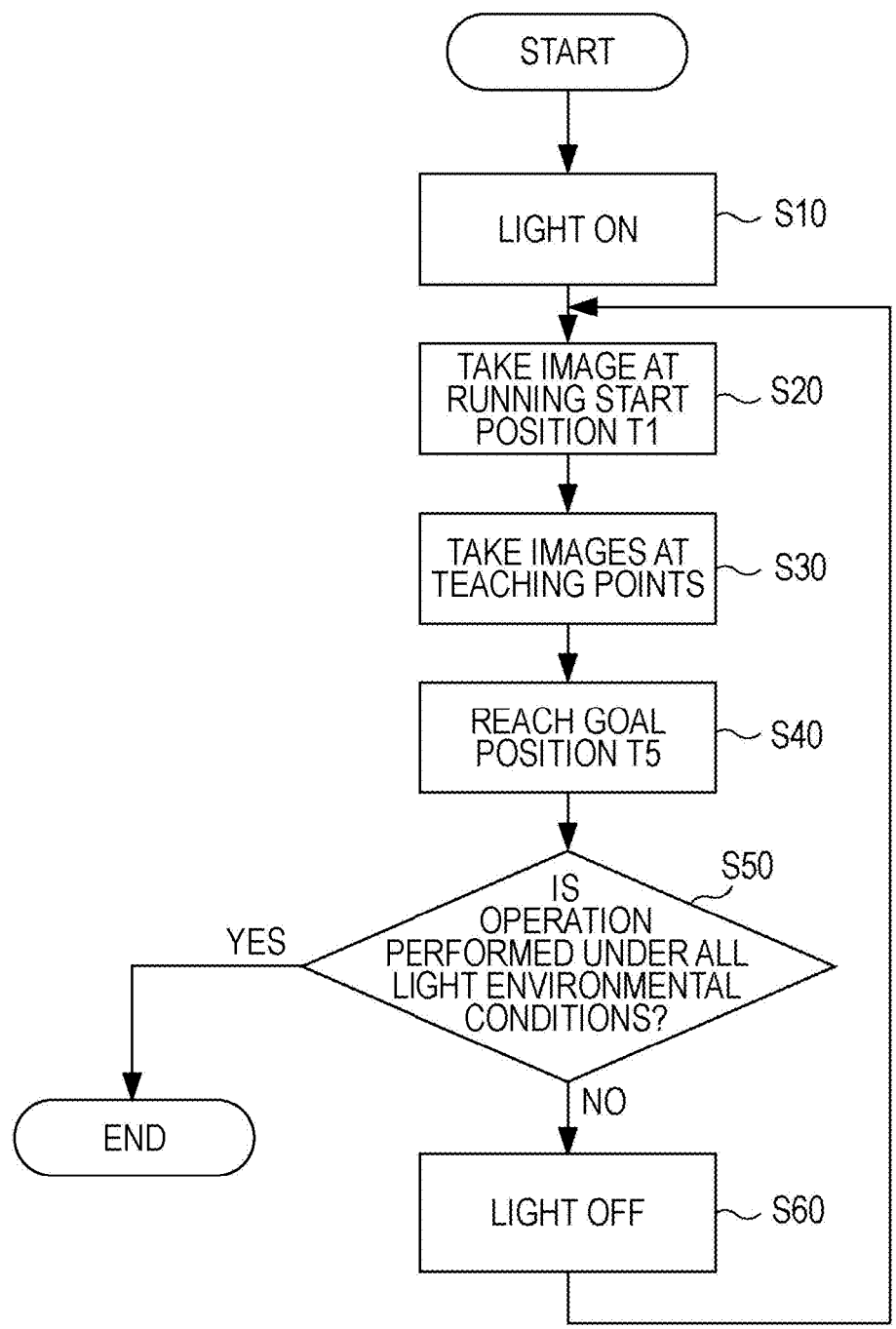
FIG. 4 is a flowchart explaining a teaching running procedure in the first embodiment.

A first embodiment of the present invention will be described with reference to the drawings.

Referring to FIG. 2, a robot system 50 of the first embodiment includes a plurality of robots 1, a running route 9 preset on a floor 51, and a floor illumination device (lighting device) 52.

Each robot 1 is provided with a carrier (not shown), and carries a load placed on the carrier from a running start position to a goal position.

The robot 1 includes a running device 2, a camera (image pickup device) 3, and a control device 4.

The running device 2 can drive and steer the robot 1. Here, the running device 2 includes juxtaposed driving wheels 30 (only one of them is shown in FIG. 2), juxtaposed driven wheels 31 that turn in all directions (only one of them is shown in FIG. 2), and an actuator 32 (e.g., a servomotor) that separately drives the driving wheels 30. The robot 1 can be moved forward and backward by driving of the driving wheels 30, and be turned (change in direction) by the difference in rotation speed between the driving wheels 30.

The actuator 32 is provided with a driving-amount detection unit (e.g., an encoder) 33 for detecting the driving amount of the actuator 32. The detection result of the driving-amount detection unit 33 is input to the control device 4.

The camera 3 is formed by a CCD camera or a CMOS camera, and is oriented in the running direction of the robot 1. The camera 3 takes images in the running direction of the robot 1 in substantially real time with a preset image taking period Ts (e.g., 10 ms). Image data (actual images) obtained by the camera 3 is sent to the control device 4.

The control device 4 is formed by a computer including a storage area, an electronic calculator, and an input terminal. As functions, the control device 4 includes a teaching-image storage unit 5, an image processing unit 6, a teaching-image selection unit 7, and a running control unit 8. The teaching-image storage unit 5 prestores a plurality of teaching images acquired in a below-described procedure.

Teaching Running Steps

A description will be given below of teaching running performed prior to autonomous running of the robot 1. Teaching running is performed to obtain teaching images to be stored in the teaching-image storage unit 5.

There are two light environmental conditions that the floor illumination device 52 for illuminating the floor 51 is on (a light-on state) or is off (a light-off state). As shown in FIG. 1, teaching image sequences A and B are acquired under the respective light environmental conditions.

That is, a state in which the floor illumination device 52 is on corresponds to a first light environmental condition, and a state in which the floor illumination device 52 is off corresponds to a second light environmental condition different from the first light environmental condition.

As shown in FIG. 3A, on the running route 9 of the first embodiment, a start position (running start position) serves as a teaching point T1, and a goal position (goal position) serves as a teaching point T5. From the start position T1 to the goal position T5, the running route 9 is dotted with a plurality of teaching points T1 to T5 (including the start and goal positions). FIG. 3B shows teaching images corresponding to the teaching points T1 to T5.

The running route 9 is virtually set on the floor 51 beforehand, but is not indicated by a line or the like. The teaching points T1 to T5 are also virtually set before teaching running. By carrying out teaching running, the positions of the teaching points T1 to T5 are fixed.

While only one running route 9 is shown on the floor 51 from the running start position T1 to the goal position T5 for plain explanation, for example, a plurality of running routes may be set on the floor 51, and a running start position and a goal position may be set in each of the running routes.

A procedure of teaching running will now be described. Referring to FIG. 4, when teaching running starts, the floor illumination device 52 is turned on in Step S10.

In Step S20, an operator (teacher) moves the robot 1 to the running start position T1 by manual running, where a still image is taken by the camera 3, and is stored as a teaching image in the teaching-image storage unit 5.

Here, the term "manual running" refers to physically moving the robot 1 by pushing (or pulling) the robot 1 or moving the robot 1 by the running device 2 operated with a manual controller such as a joystick.

Subsequently, in Step S30, the robot 1 is moved along the running route 9 by manual running, and still images are taken by the camera 3 when the robot 1 passes the teaching points T2 to T4. The taken images are stored as teaching images in the teaching-image storage unit 5.

The teaching points T1 to T5 are set beforehand at preset intervals (teaching intervals). Most simply, the distance from the start position T1 to the goal position T5 can be divided equally.

In Step S30, teaching images are acquired at the teaching intervals set in accordance with the output from the driving-amount detection unit 33. Alternatively, teaching images may be taken at regular time intervals.

In Step S40, when the robot 1 reaches the goal position T5, the camera 3 acquires a teaching image, and the robot 1 is stopped.

A plurality of teaching images acquired in Steps S20 to S40 are stored as a teaching image sequence (teaching image group) A in the teaching-image storage unit 5.

When it is determined in Step S50 that the above-described teaching running is not performed in all light environmental conditions (the illumination device is not turned on or off in this case), the floor illuminating device 52 is turned off in Step S60, and teaching running is performed again through Steps S20 to S40, thereby obtaining a teaching image sequence B.

Autonomous Running Steps

Figure 5:
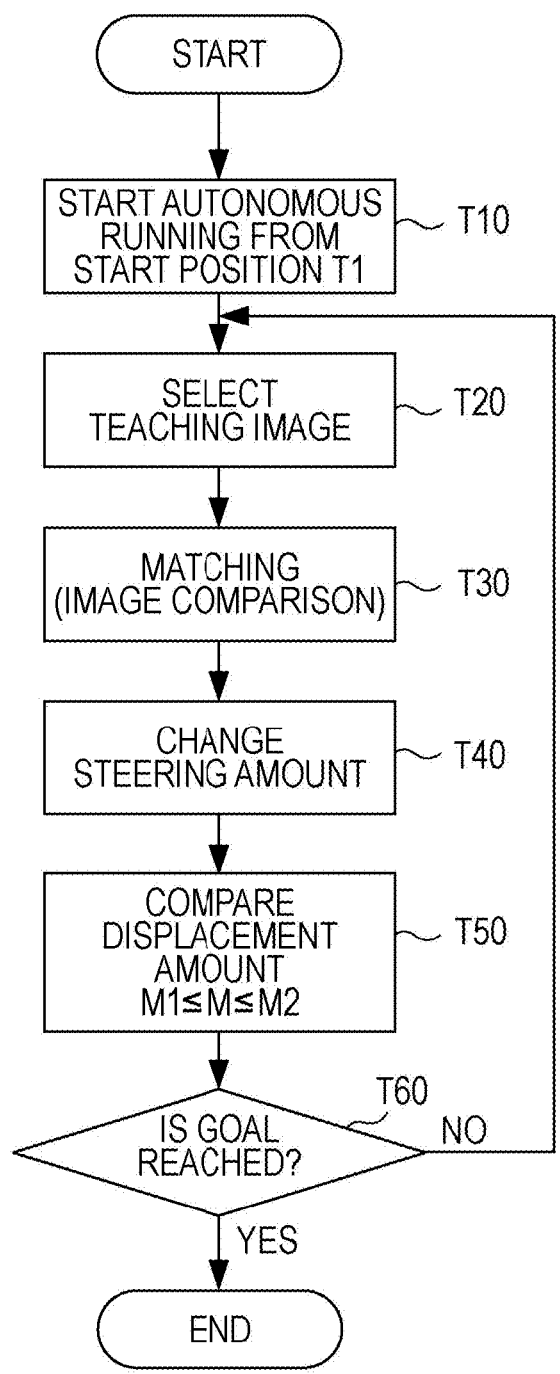
FIG. 5 is a flowchart explaining an autonomous running procedure in the first embodiment.

Next, autonomous running of the robot 1 will be described with reference to FIG. 5. As shown in FIG. 5, the robot 1 starts acquisition of actual images with the camera 3 at the running start position T1 (Step T10).

In this case, the image processing unit 6 checks the actual images taken in Step T10 against all teaching images in the teaching image sequences A and B that are stored in the teaching-image storage unit 5 during teaching running, and calculates the matching degrees (checking degrees) between the actual images and the teaching images. Then, the teaching-image selection unit 7 selects, as a present teaching image, a teaching image that has the highest matching degree (checking degree) with the corresponding actual image (that is, that matches best with the actual image) (Step T20).

The displacement amount M between the present teaching image extracted in Step T20 and the actual image is calculated (Step T30). Here, the image processing unit 6 selects, as an image characteristic point, at least one point where an image pattern is similar, from each of the present teaching image and the actual image, compares the positions of the characteristic points of the present teaching image and the actual image, and calculates the distance between the characteristic points (that is, the displacement amount between the teaching image and the actual image). When there are two or more characteristic points, the displacement amount is obtained from the average distance therebetween. This displacement amount corresponds to the matching degree. As the displacement amount decreases, the matching degree increases.

In Step T30, a running direction of the robot 1 such that a horizontal component of the calculated displacement amount decreases is calculated, a steering-amount instruction value is calculated therefrom, and a signal corresponding to the value is transmitted to the running device 2. The running device 2 steers the robot 1 according to the steering-amount instruction value so that the robot 1 moves along the running route 9 taught during teaching running (Step T40).

After that, the operations in Steps T20 and T30 are performed at regular calculation periods. When the displacement amount M between the present teaching image and the actual image is less than a preset value M1 (that is, the matching degree is more than a threshold value), the teaching-image selection unit 7 selects, as the next present teaching image, one of the remaining teaching images that has the highest matching degree with the latest actual image (T50). The remaining teaching images are teaching images other than the currently selected teaching image (present teaching image) and the teaching image (preceding teaching image) that has been subjected to matching.

When the displacement amount M is more than a preset value M2 (that is, the matching degree is less than second threshold value) in Step T50, an attempt is made to increase the matching degree by changing the actual image, for example, by turning the robot 1 to the right or left at that position (image search operation). When the displacement amount M remains more than or equal to the value M2 in spite of the attempt, one of the remaining teaching images, except the currently selected teaching image (present teaching image), which has the highest matching degree with the latest actual image, is selected again as the next present teaching image.

The value M1 is set beforehand by experiment or the like to determine whether or not the robot 1 reaches the teaching point corresponding to the present teaching image. The value M2 is found beforehand by experiment or the like to determine whether or not the displacement amount between the present teaching image and the actual image is too large to control the running device 2.

In Step T60, in a state in which a teaching image at the goal position is selected, until the displacement amount M becomes less than or equal to the preset value M1 (that is, the matching degree becomes more than or equal to the threshold value), the operations in Steps T20 to T50 are repeated with a predetermined calculation period (equal to the image taking period of the camera 3).

When the teaching image at the goal position is selected and the displacement amount M becomes more than or equal to the preset value M2, it is determined that the robot 1 reaches the goal position T5, and the running device 2 is stopped.

In the robot system of the first embodiment of the present invention having the above-described configuration, teaching image sequences are acquired by performing teaching running under the different light environmental conditions where the floor illuminating device 52 is on and off, and the running direction of the robot 1 is controlled thereby. Hence, for example, the impossibility of selecting the characteristic points because of the change in brightness distribution of images (actual images) acquired from the camera 3 due to the change in the light environment and appearance of light and a shadow in undesirable positions due to the floor illuminating device 52 is reduced. Consequently, the robot 1 can autonomously run along the running route with a higher precision.

When the displacement amount M is more than or equal to M2 in Step T50, it is conceivable that the matching degree is lowered by an expected change in running direction due to irregularities on the floor or slipping of the driving wheels or the driven wheels. Thus, by calculating a running direction that recovers the matching degree by the image search operation, the robot 1 can restart running in the normal running direction.

When the matching degree is not recovered by the image search operation and the displacement amount M remains more than or equal to M2 in Step T50, it is conceivable that the light environmental condition around the running route 9 is changed, for example, the floor illuminating device 52 is turned on or off. Hence, the teaching-image selection unit 7 can reselect, as the present teaching image, the best one of the stored teaching images. This allows the robot 1 to autonomously run with precision in accordance with the best teaching image.

Next, a first modification of the first embodiment will be described. The first modification is mostly similar to the first embodiment. Components similar to those adopted in the first embodiments are denoted by the same reference numerals, and descriptions thereof are omitted.

In the first modification, more light environmental conditions are set than in the first embodiment. That is, the following light environmental conditions (3) and (4) are set in addition to the condition (1) that a floor illuminating device 52 is on and the condition (2) that the floor illuminating device 52 is off, which are adopted in the first embodiment:

(3) The present time is within a set range (when the floor illuminating device 52 is on); and (4) The present time is out of the set range (when the floor illuminating device 52 is on). Corresponding to the light environmental conditions (1) to (4), teaching image sequences A to D are acquired, and are stored in a teaching-image storage unit 5.

Further, in the first modification, the present light environmental condition can be obtained on the basis of signals from a clock including a teaching-image selection unit 7, and the floor illuminating device 52.

The teaching-image selection unit 7 selects, as a present teaching image sequence, one of the teaching image sequences A to D corresponding to the obtained present light environmental condition, which has the highest matching degree with actual images, with a predetermined calculation period. Then, the teaching-image selection unit 7 calculates the displacement amount M between the actual images and the present teaching images, and calculates a steering-amount instruction value therefrom.

A description will be given of autonomous running of a robot 1 according to the first modification. At a start position T1, the robot 1 starts to run, and the teaching-image selection unit 7 obtains a present light environmental condition. Further, a camera 3 starts to take actual images.

In this case, an image processing unit 6 checks the taken actual images against teaching images included in a teaching image sequence corresponding to the present light environmental condition, and thereby calculates the matching degrees between the actual images and the teaching images. Then, the teaching-image selection unit 7 selects, as a present teaching image, a teaching image that has the highest matching degree (checking degree) with the corresponding actual image (that is, a teaching image that matches best with the actual image).

Subsequently, the displacement amount between the extracted present teaching image and the actual image is calculated. Then, a running direction of the robot 1 such that a horizontal component of the calculated displacement amount becomes small, is calculated, a steering-amount instruction value is calculated therefrom, and a signal corresponding to the steering-amount instruction value is transmitted to a running device 2. The running device 2 steers the robot 1 according to the steering-amount instruction value so that the robot 1 runs along a running route 9 taught in teaching running.

Unlike the first embodiment, a threshold of the displacement amount (matching degree) M between the actual image and the present teaching image is not set in the first modification.

While the running device 2 causes the robot 1 to continuously run along the running route 9, a teaching image that has the highest matching degree with the actual image is updated.

After that, when it is detected, from information from a preset separate IC tag, that the robot 1 reaches the goal position T5, a running control unit 8 determines that the robot 1 reaches the goal position T5, and stops the running device 2.

According to the robot system of the first modification, a teaching image sequence can be acquired under each of the conditions concerning the on/off state of the floor illuminating device 52 and the conditions concerning the sunlight that changes with time.

Figure 6A:
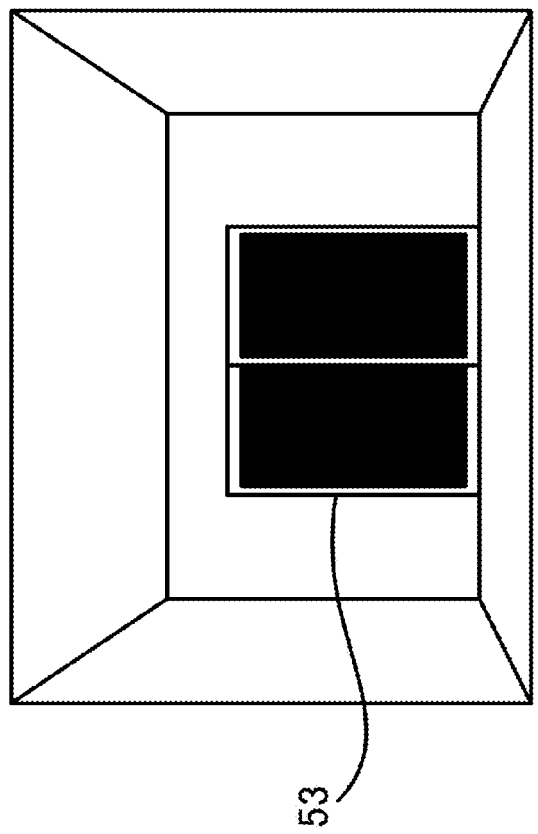
FIG. 6A schematically shows an example of a light environment near a running route according to a first modification of the first embodiment.

For example, when teaching image sequences are respectively acquired in a time range when sunlight pierces through a window 53 near the running route 9 of the robot 1 to bring about a backlit state, as shown in FIG. 6A, and at a different time, even if the condition of light incident from the window 53 suddenly changes, stable autonomous running of the robot 1 is possible.

Figure 6B:
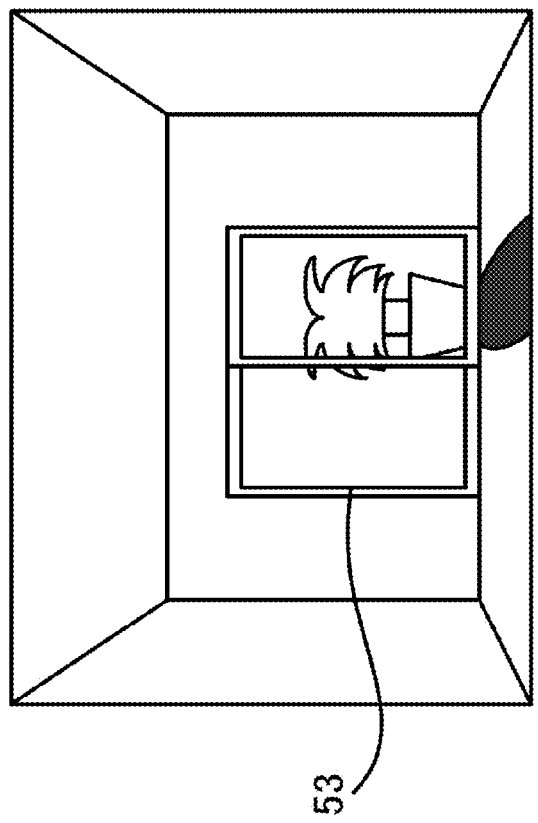
FIG. 6B schematically shows an example of a light environment near the running route in the first modification.

Alternatively, when teaching images are respectively acquired in a daytime range and a nighttime range shown in FIG. 6B, even if the amount of light passing through the window 53 greatly changes from the daytime to the nighttime, stable autonomous running of the robot 1 is possible.

By thus acquiring teaching images under more light environmental conditions during teaching running, the robot 1 can reliably and precisely run even if the light environment on the floor 51 changes during autonomous running.

Further, since the teaching-image selection unit 7 obtains the present light environmental condition and selects and limits a teaching image sequence to be used beforehand in the first modification, it is possible to reduce the amount of processing of the control device 4 during autonomous running, and to thereby reduce the processing time.

Next, a second modification of the first embodiment will be described. The second modification is mostly similar to the first modification. Components similar to those adopted in the first embodiment are denoted by the same reference numerals, and descriptions thereof are omitted.

The second modification is different from the first embodiment in that new teaching images are acquired during autonomous running and are stored in a teaching-image storage unit 5.

Figure 7:
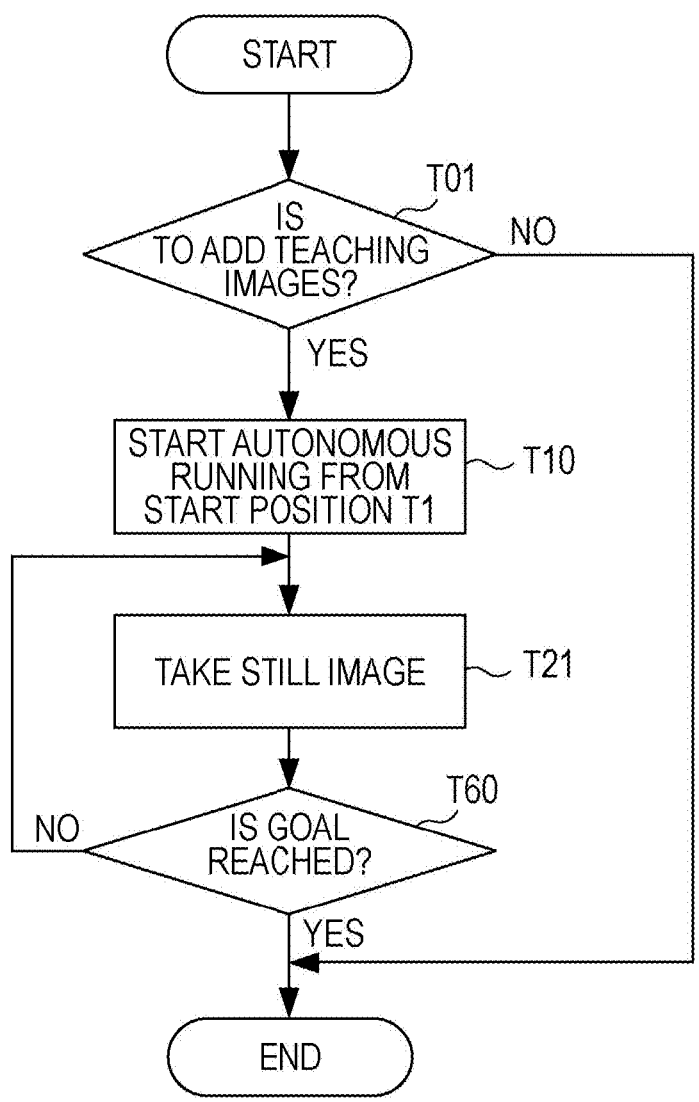
FIG. 7 is a flowchart explaining a procedure for acquiring teaching images during autonomous running of a robot according to a second modification of the first embodiment.

That is, as shown in FIG. 7, it is first determined at a start point T1, before autonomous running, whether or not to take and add teaching images in autonomous running (Step T01).

The determination in Step T01 is made according to the presence or absence of a teaching image sequence corresponding to the present light environmental condition. For example, when a teaching image having the highest matching degree (checking degree) with an actual image (that is, most coincides with the actual image) is selected and the matching degree M thereof is less than or equal to a preset third threshold value M3, it can be determined that the teaching image sequence corresponding to the present light environmental condition is not stored in the teaching-image storage unit 5.

By the operation in Step T01, it is possible to prevent similar teaching images from being excessively accumulated because teaching image sequences are added in every autonomous running.

Instead of being performed before autonomous running, the operation in Step T01 may be performed immediately after Step T21 during autonomous running. This prevents duplication of teaching images.

In Step T10, a camera 3 takes an image. Subsequently, the camera 3 takes still images at predetermined intervals (Step T21). The image taking intervals are determined by, for example, the time or the running distance calculated from the rotation number of the wheels. When it is determined in Step T60 that the robot 1 reaches the goal, the procedure is finished, and a plurality of teaching images acquired through Steps T10 and T21 are stored as a teaching image sequence (teaching image group) in the teaching-image storage unit 5. This procedure is performed in parallel with the autonomous running steps, and Steps T10 and T60 in FIGS. 5 and 7 are performed in synchronization.

The first embodiment and the first modification may be combined appropriately. For example, the threshold value M1 in the first embodiment may be omitted, and the best teaching image may be selected from all teaching images stored in the image storage unit with a calculation period so as to update the present teaching image, similarly to the first modification.

Further, the light environmental conditions are not limited to those in the embodiment, and may be set appropriately. For example, a state in which a large moving object (e.g., a movable carriage or a shutter) that is reflected as an actual image is present and a state in which no moving object is present may be set as light environmental conditions, and teaching image sequences may be acquired for the same running route under the respective light environmental conditions.

Second Embodiment

A second embodiment of the present invention will be described with reference to the drawings.

Figure 9:
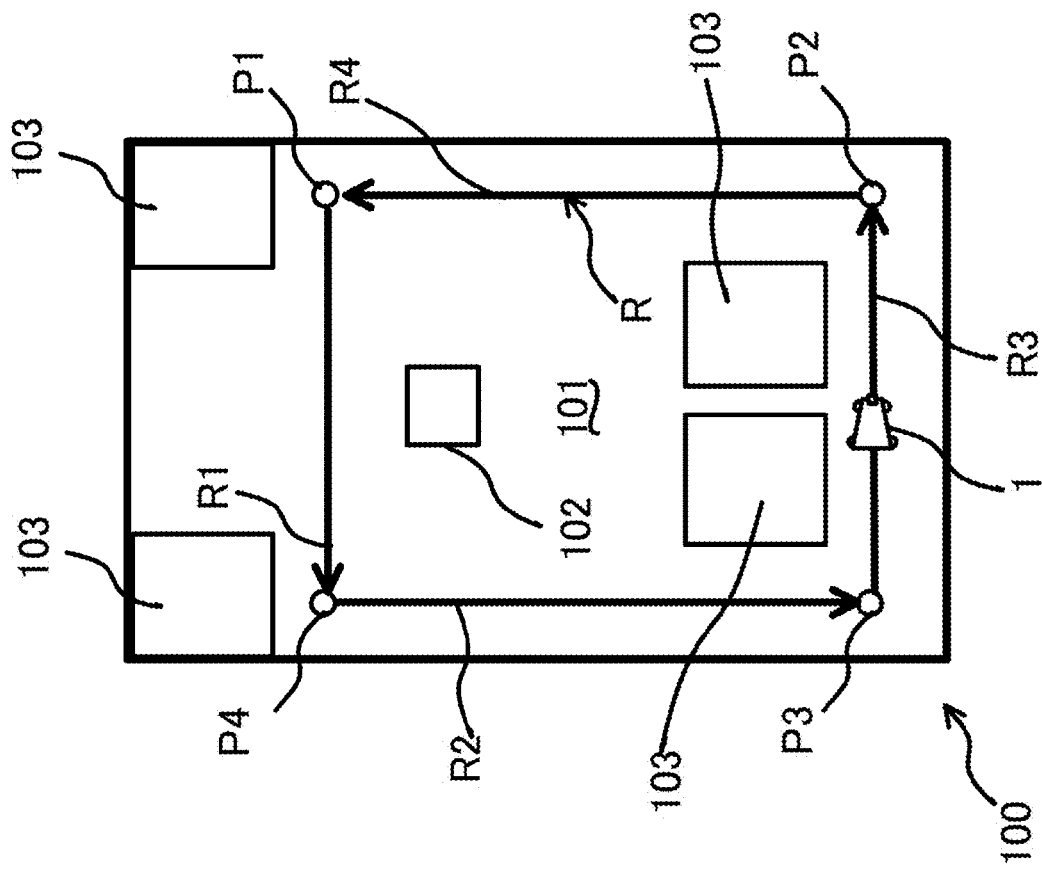
FIG. 9 schematically shows a robot system according to the second embodiment.

Referring to FIG. 9, an automated carrier system (robot system) 100 includes a robot 201 and a floor 101 in a plant or the like. An overall route (running route) along which the robot 201 runs is set on the floor 101. Also, operation cells (carriage goal points) 103 are provided on the floor 101. When the robot 201 reaches a stop point near any of the operation cells 103, goods loaded on the robot 201 are taken out by a handling robot (not shown) provided in the operation cell 103.

The overall route includes four linear running routes R1 to R4. The running route R1 starts from a point P1 and ends with a point P4, the running route R2 starts from the point P4 and ends a point P3, the running route R3 starts from the point P3 and ends with a point P2, and the running route R4 starts from the point P2 and ends with the point P1. That is, the points P1 to P4 serve as start points when the routes start therefrom, and serve as goal points when the routes end therewith.

While the overall route is simplified for plain explanation in FIG. 9, it can be set to be more complicated. Further, while the running routes R1 to R4 are shown by lines with arrows, such lines or the like indicating the running routes are actually not provided on the floor 101.

Figure 8:
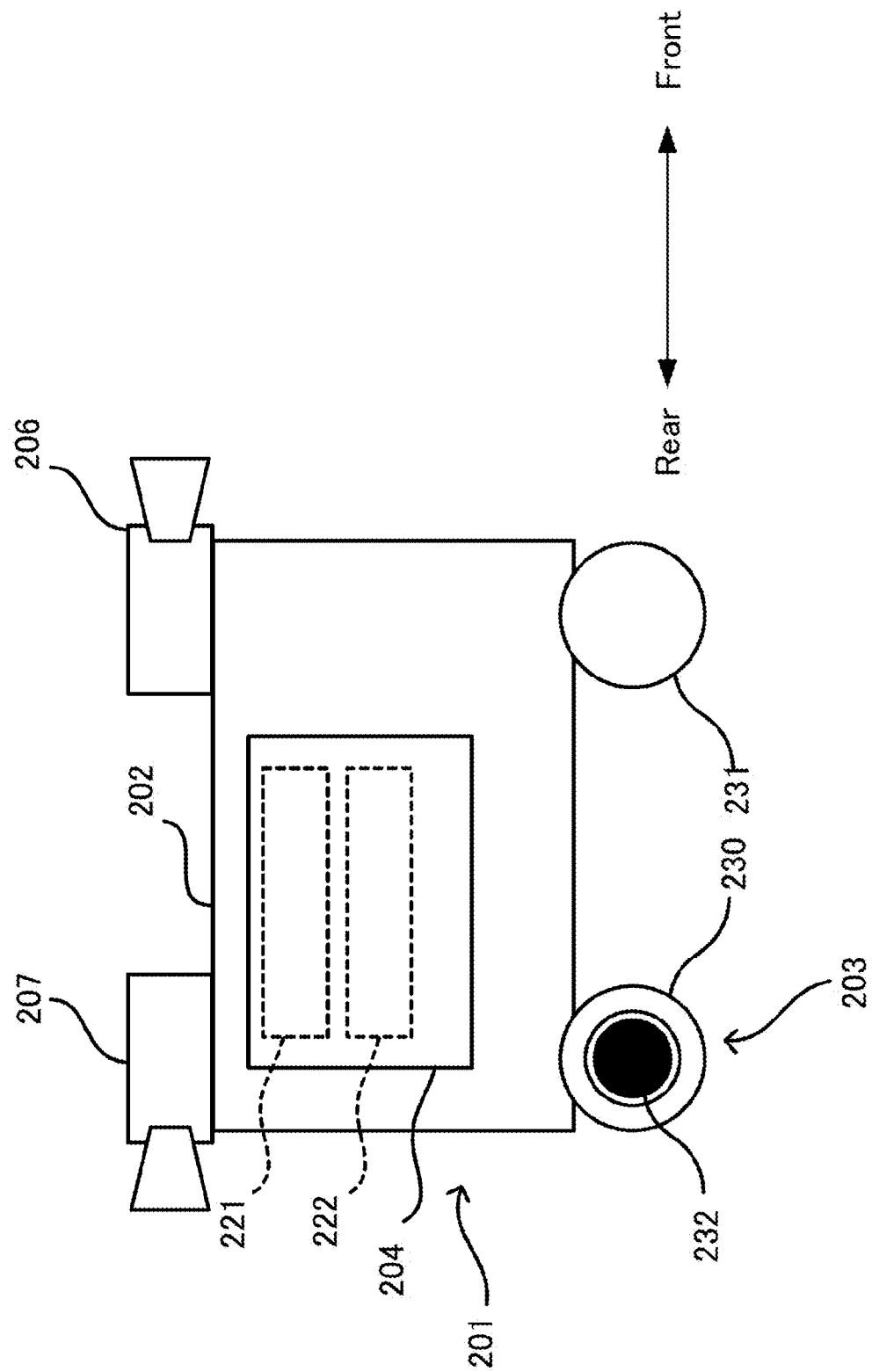
FIG. 8 schematically shows a configuration of a robot according to a second embodiment.

Next, the structure of the robot 201 will be described. As shown in FIG. 8, the robot 201 incorporates a control device (driving control device) 203 formed by a computer mounted in a robot body 202.

The robot body 202 also includes a driving device (driving mechanism) 204 for driving and steering the robot 201. Here, the driving device 204 includes two juxtaposed driving wheels 230 (only one of them is shown in FIG. 8), juxtaposed wheels 231 (only one of them is shown in FIG. 8) which can turn in all directions, and an actuator 232 (e.g., a servomotor) which separately drives the driving wheels 230. The robot 201 can be moved forward and rearward by driving of the driving wheels 230, and can be turned (change its direction) by the difference in rotation speed between the driving wheels 230. While two driving wheels and two driven wheels are provided in the structure shown in FIG. 8, the driving structure is not limited thereto. It is possible to adopt any driving structure that can control the running speed, position, and posture of the robot 201, for example, three-wheel driving using omni wheels.

The robot body 202 is provided with a first camera 206 and a second camera 207 formed by CCD cameras or CMOS cameras. The first camera 206 and the second camera 207 are oppositely oriented in the running direction (front-rear running direction) of the robot 201.

In other words, the first camera 206 is set on the center axis of the robot 201 in a manner such as to point forward in the running direction, and takes images on the front side in the running direction in FIG. 8.

The second camera 207 is set to take images on the rear side in the running direction.

The first camera 206 and the second camera 207 take images with a preset image-taking period Ts (e.g., 10 ms). Obtained image data (acquired images) is sent to the control device 203.

The first camera 206 and the second camera 207 are oriented parallel to the running direction in order to minimize blurring of acquired images due to running of the robot 201 (that is, acquired images easily blur because the degree of change in the acquired images due to running increases as deviation from the front side in the running direction increases), and to thereby stably and precisely perform pattern matching that will be described below.

Hereinafter, in a case in which both the first camera 206 and the second camera 207 will be referred to, they will also be simply referred to as cameras 206 and 207.

The control device 203 is formed by a computer having a storage area, an electronic calculator, and an input terminal, and includes a storage unit 221 and a running control unit 222 as functions.

The storage unit 221 stores teaching image data including a plurality of image data acquired beforehand.

Teaching images are image data serving as targets of images (first acquired image and second acquired image) that are acquired by the first camera 206 and the second camera 207 while the robot 201 runs along the running routes R1 to R4. Teaching images are acquired at teaching points preset on the running routes R1 to R4 by experiment or the like, and these teaching images are stored in the storage unit 221.

Teaching images include teaching images for the first camera 206 (first teaching images) and teaching images for the second camera 207 (second teaching images). First teaching images are acquired in the image-taking direction of the first camera 206 (at the points P4, P3, P2, and P1 in this order in FIG. 9), and second teaching images are acquired in the image-taking direction of the second camera 207 (at the points P1, P2, P3, and P4 in this order in FIG. 9).

The running control unit 222 performs pattern matching on the basis of a plurality of teaching images stored in the storage unit 221, as will be described. By pattern matching, the running control unit 222 finds deviations of position and angle in the right-left direction of the robot 201 from the ideal running routes R1 to R4, and controls the movements of the driving wheels 230 to correct the running direction of the robot 201 so that the robot 201 can run along the running routes.

Here, a description will be given of image data acquired from the first camera 206 and the second camera 207 with reference to FIGS. 10 and 11.

Figure 10:
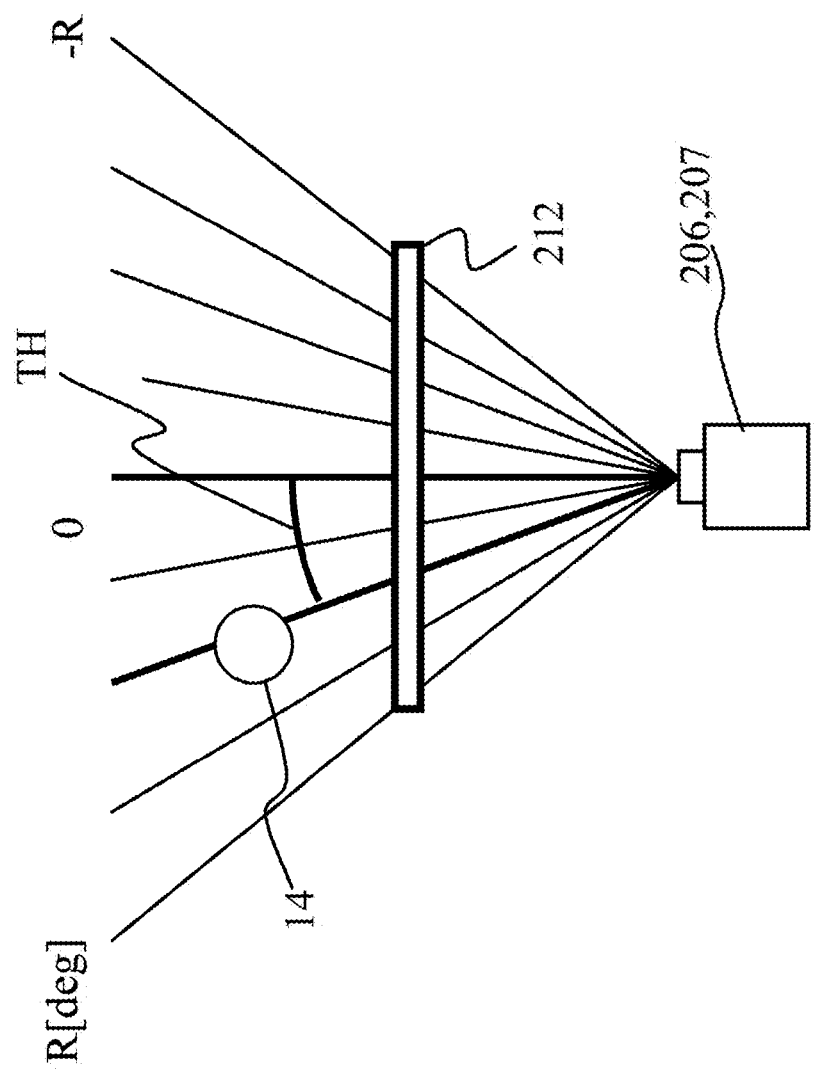
FIG. 10 shows a characteristic of a camera.

In FIG. 10, image data (taken image) 212 is taken by the first camera 206 or the second camera 207. The taken image 212 is a unit of pixels in accordance with the resolution of the first camera 206 or the second camera 207.

Reference numeral 214 denotes an actual object whose images are taken by the first camera 206 and the second camera 207.

As shown in FIG. 10, the position of the object 214 on the taken image 212 is determined by the angle TH of the object 214, as viewed from the first camera 206.

Figure 11:
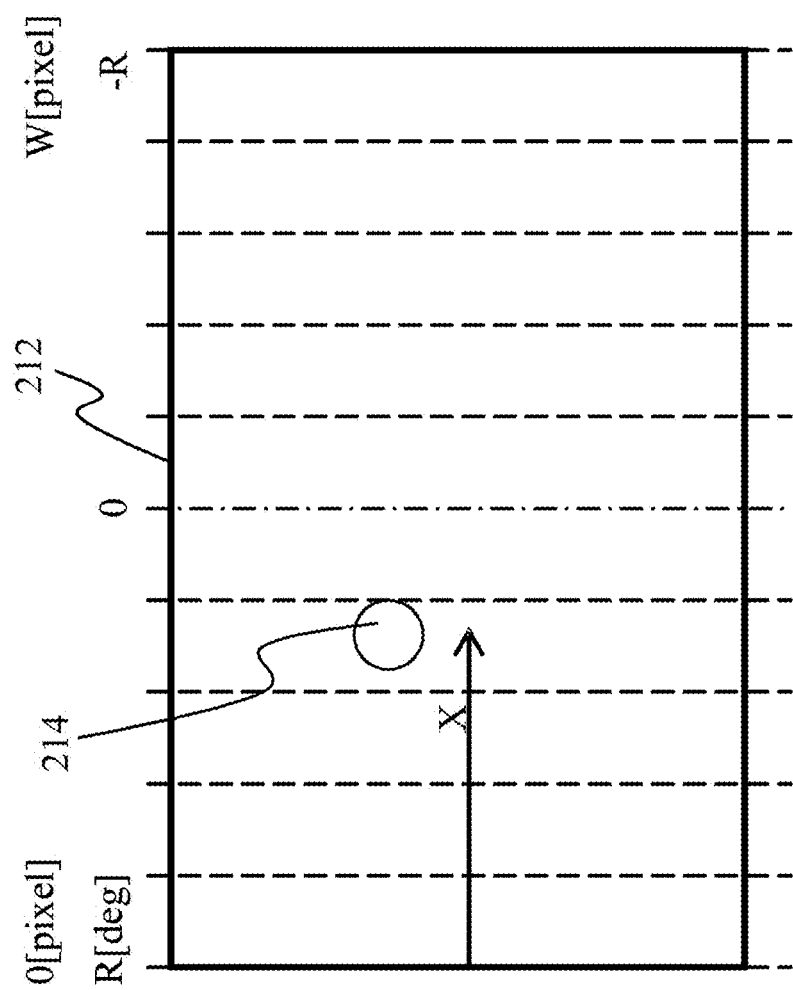
FIG. 11 shows a characteristic of the camera.

Further, as shown in FIG. 11, when it is assumed that the image-taking range of the cameras 206 and 207 is −R(deg) to R(deg), the width of the image is W (pixel), and the position of the object 214 on the image is X (pixel), the angle TH of the object 214 viewed from the camera is given by the following Expression (1):

$$TH = 2*R/W*X + R \tag{1}$$

In the present invention, since the first camera 206 is oriented forward in the running direction of the robot 201, the angle TH in the above Expression (1) indicates the angle of a first teaching image 210 with respect to the running direction of the robot 201. Similarly, as for the second camera 207, the angle TH in the above Expression (1) indicates the angle of a second teaching image 211 with respect to the axis opposite the running direction of the robot 201.

Next, a description will be given of an operation of the running control unit 222 for finding the deviation in the right-left direction of the robot 201 from the running routes R1 to R4 and posture angle of the robot 201 by using the characteristics of the first camera 206 and the second camera 207, and correcting the deviation and the posture angle.

As described above, the storage unit 221 stores the first teaching images 210 and the second teaching images 211 (these will also be called landmarks) acquired beforehand. To obtain these landmarks, while the robot 201 is moving along the running routes R1 to F4, it is stopped at predetermined intervals set by experiment or the like, where images are acquired by the first camera 206 and the second camera 207, as shown in FIG. 12.

Figure 12:
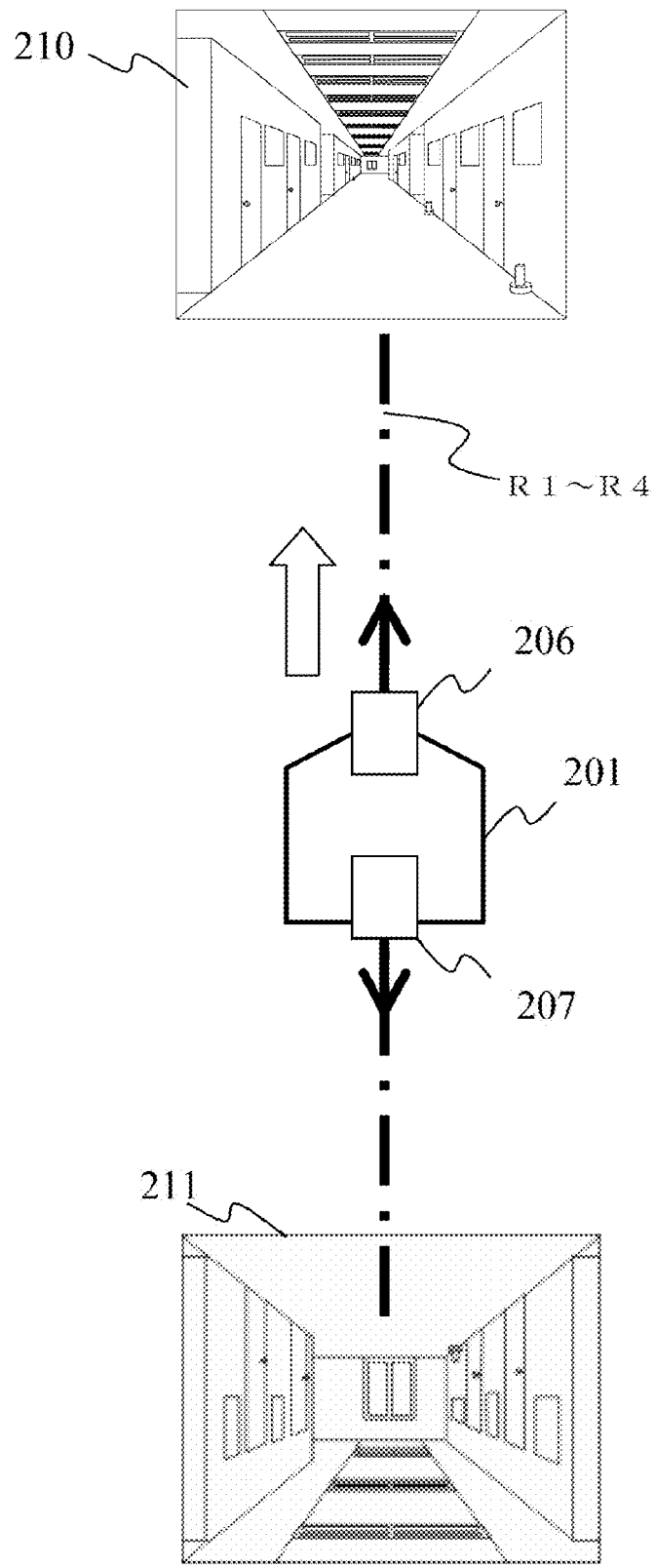
FIG. 12 shows a state in which the robot is present on a linear portion of a running route and the running direction coincides with the running route.

FIGS. 13A and 13B show images taken in the state shown in FIG. 12. In the second embodiment, the taken images are entirely stored and used as landmarks. In the figures, H represents a virtual position of the first teaching image 210 on the taken image that is obtained by performing pattern matching between the first teaching image 210 and the image taken during running, and E represents a virtual position of the second teaching image 211.

Figure 14:
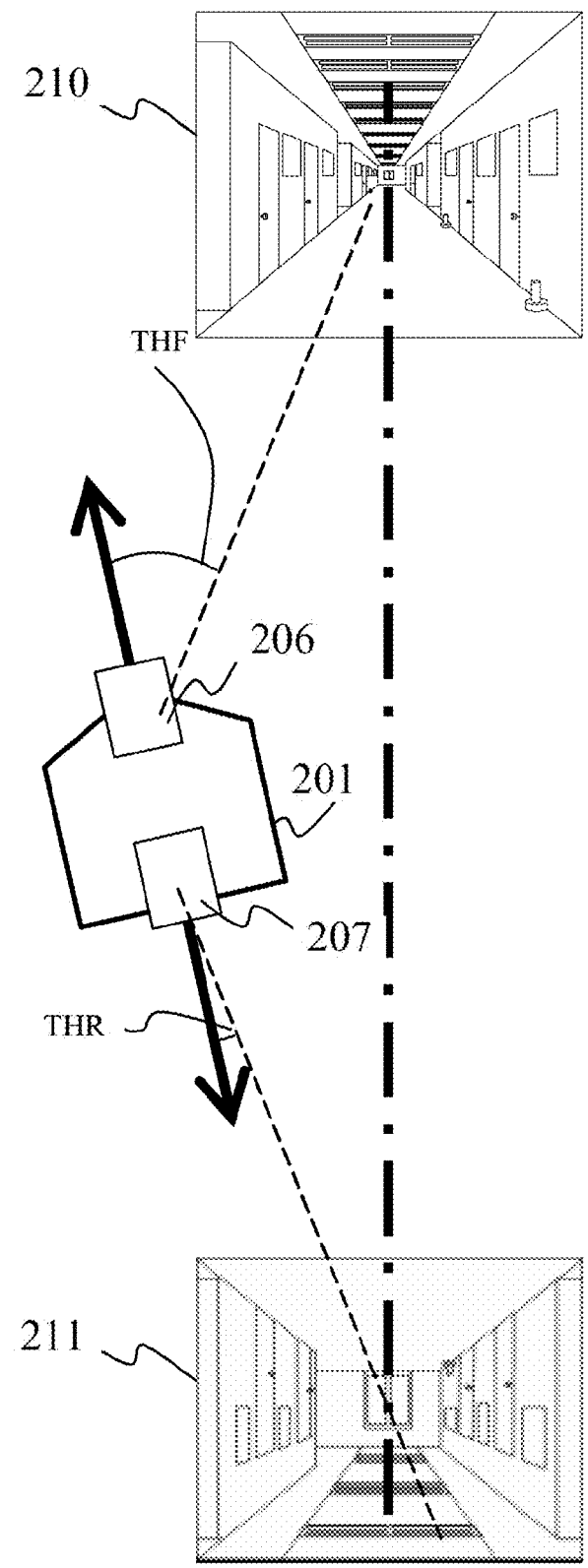
FIG. 14 shows a state in which the robot deviates from the linear portion of the running route and the running direction does not coincide with the running route.

FIG. 14 shows a state in which the robot 201 deviates from the running routes R1 to R4. In FIG. 14, THF represents the angle of the first teaching image 210 with respect to the first camera 206, and THR represents the angle of the first teaching image 211 with respect to the second camera 207.

Figure 15A:
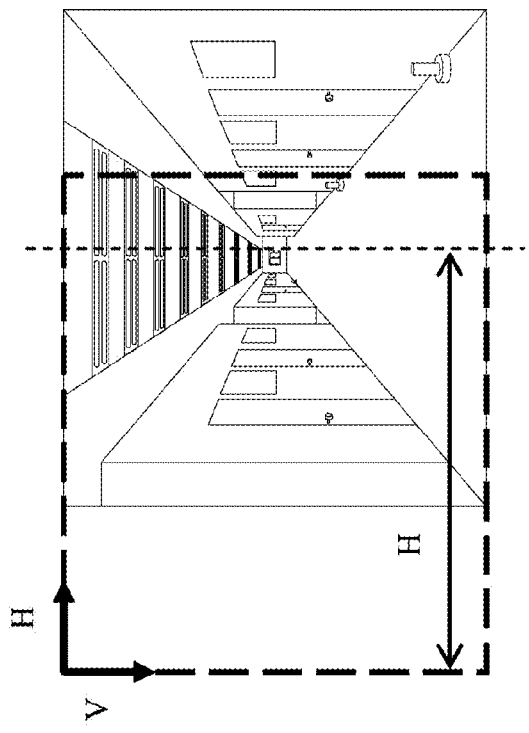
FIG. 15A shows an image taken in the state shown in FIG. 14.
Figure 15B:
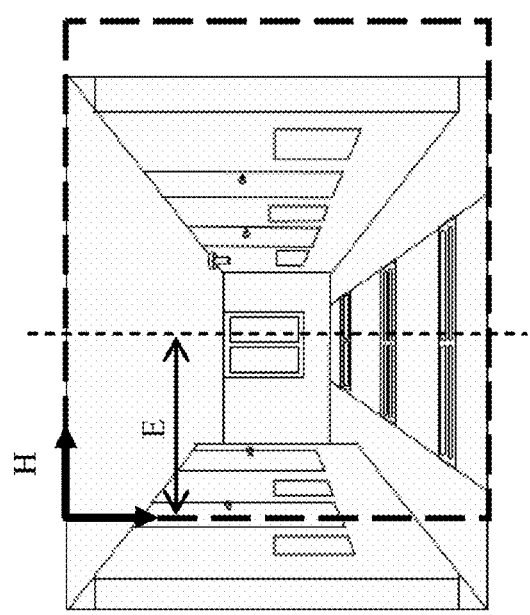
FIG. 15B shows an image taken in the state shown in FIG. 14.

FIGS. 15A and 15B show images taken by the cameras in the state shown in FIG. 14. FIG. 15A shows an image taken by the first camera 206, and H represents the horizontal position of the first teaching image 210 on the image. FIG. 15B shows an image taken by the second camera 207, and E represents the horizontal position of the second teaching image 211 on the image. When it is assumed that V (pixel) represents the position of the object on the image in FIG. 15A, the angle THF is found by substituting H for X in the above Expression (1).

Similarly, the angle THR can be found by substituting E. The angles THF and THR thus found are fed back to the control device 203.

In the second embodiment, a control expression for making correction by controlling the speed of the robot 201 is given as an example. When the robot 201 is precisely positioned on the running routes R1 to R4, the difference THF−THR is 180 (degrees). Hence, a target state for deviation from the running routes R1 to R4 is expressed by (THR−THF−180(deg))=0.

From this, it can be determined in which of the right and left directions the robot 201 should move to approach the linear portion of the running route. Further, a target state of the posture angle with respect to the first teaching image 210 that is to be obtained to precisely align the running direction of the robot 201 with the linear portion of the running route is expressed by THF=0.

The following expressions are Control Expressions (2) and (3) for finding a speed instruction value that makes correction such that the robot 201 runs on the running route:

$$VX = GX*(THR-THF-180(\text{deg})) \qquad (2)$$

$$VTH = -GTH*THF \qquad (3)$$

where VX represents the speed of the robot 201 in the right-left direction, VTH represents the changing speed of the posture angle, and GX represents the control gain with respect to the deviation in the right-left direction.

The control device 203 controls the driving wheels 230 of the robot 201 on the basis of the values VX and VTH obtained from Expressions (2) and (3). According to Expressions (2) and (3), the speeds in the posture angle direction and the right-left direction are uniquely obtained from the values H and E. Moreover, since the deviation in the posture angle direction and the deviation in the right-left direction are independent of the values H and E, the sum of VX and VTH in Expressions (2) and (3) is fed back to the control device 203.

According to the speed instruction value thus calculated to correct the deviation and posture angle with respect to the running routes R1 to R4, the driving wheels 230 are driven to control running of the robot 201.

By the above-described processing, it is possible to correct the position and posture angle of the robot 201 and to cause the robot 201 to precisely move along the running routes R1 to R4.

The running routes R1 to R4 respectively include the linear portions and the direction changing portions (points P1 to P4) for connecting the linear portions. The robot 201 checks distance information included in running data given beforehand against the present running distance from the start point, and thereby determines in which of the linear portion and the direction changing portion the robot 201 is now running. Running control of the present invention is exerted when the robot 201 is running in the linear portion. When the robot 201 is running in the direction changing portion, running in the next linear portion is started after changing the direction on the basis of the rotation amount of the wheels.

A modification of the second embodiment will now be described. Structures similar to those adopted in the second embodiment are denoted by the same reference numerals, and descriptions thereof are omitted.

This modification is different from the second embodiment in that a first camera 206 and a second camera 207 are offset from the center axis of a robot 201 and are fixed at positions symmetrically with respect to the center point about which the robot 201 turns, as shown in FIG. 16. Similarly to the second embodiment, the robot 201 is moved on running routes R1 to R4, and the center axis of the robot 201 is made to coincide with the running direction. In this state, a first teaching image 210 and a second teaching image 211 are taken.

By applying control expressions similar to those adopted in the second embodiment by using the images taken by the first camera 206 and the second camera 207, the position and posture angle of the robot 201 can be corrected, so that the robot 201 can precisely move along the running routes.

In this way, the fields of view of the cameras can be prevented from being blocked by the object in front of or behind the robot. For example, even in a situation where the robot runs while leading the user, it can precisely move on the running routes. In addition, even if the running direction is reversed, as shown in FIG. 17, it is only necessary to interchange the front and rear teaching images. This shortens the teaching operation.

While the embodiments of the present invention have been described above, the present invention is not limited to the above-described embodiments, and various modifications can be made without departing from the scope of the present invention.

For example, the first embodiment and the second embodiment may be combined appropriately.

Further, the present invention is appropriately applicable to a robot capable of autonomous running, for example, a service robot.

What is claimed is:

1. A robot system comprising:
    a robot body configured to run along a running route;
    a driving mechanism configured to drive the robot body in a front-rear direction and a turning direction;
    a driving control device mounted in the robot body and configured to control the driving mechanism; and
    a camera mounted in the robot body and configured to take an actual image,
    wherein the driving control device includes:
        a teaching-image storage unit configured to store teaching images acquired at a plurality of separate teaching points on the running route from a running start position to a goal position under a first environmental lighting condition, and teaching images acquired at the plurality of separate teaching points on the running route under a second environmental lighting condition different from the first environmental lighting condition;
        a teaching-image selection unit configured to select a present teaching image from the teaching images stored in the teaching-image storage unit, the present teaching image being a target for the robot body in a running direction at present; and
        a running control unit configured to control the driving mechanism so as to increase a matching degree between the present teaching image selected by the teaching-image selection unit and the actual image taken by the camera.

2. The robot system according to claim 1,
    wherein the teaching-image selection unit selects, as the present teaching image, a teaching image that has the highest matching degree with the actual image, from the teaching images stored in the teaching-image storage unit, and
    wherein, when the matching degree between the present teaching image and the actual image becomes more than or equal to a threshold value, the teaching-image selection unit selects, as the next present teaching image, a teaching image that has the highest matching degree with the actual image, from the remaining teaching images.

3. The robot system according to claim 2, wherein, when the matching degree between the present teaching image and the actual image becomes less than or equal to a second threshold value, the teaching-image selection unit selects, as the next present teaching image, a teaching image that has the highest matching degree with the actual image, from the teaching images stored in the teaching-image storage unit.

4. The robot system according to claim 1,
wherein the teaching-image selection unit selects, as the present teaching image, a teaching image that has the highest matching degree with the actual image, from the teaching images stored in the teaching-image storage unit, and
wherein the running control unit controls a steering amount of the driving mechanism so as to increase the matching degree between the present teaching image and the actual image.

5. The robot system according to claim 1,
wherein the teaching-image selection unit acquires a present light environmental condition,
wherein the teaching-image selection unit selects, as the present teaching image, a teaching image that has the highest matching degree with the actual image, from the teaching images corresponding to the acquired present light environmental condition, and,
wherein, when the matching degree between the present teaching image and the actual image becomes more than or equal to a threshold value, the teaching-image selection unit selects, as the next present teaching image, a teaching image that has the highest matching degree with the actual image, from the remaining teaching images.

6. The robot system according to claim 1, wherein the camera acquires actual images at the plurality of image-taking points on the running route during autonomous running of the robot body, and add the actual images as teaching images to the teaching-image storage unit.

7. The robot system according to claim 6, wherein the teaching images are added to the teaching-image storage unit during autonomous running of the robot body only when the matching degree of the teaching image that has the highest matching degree is less than or equal to a third threshold value.

8. The robot system according to claim 1, wherein the light environmental condition includes a condition concerning a lighting state of the running route.

9. The robot system according to claim 1, wherein the light environmental condition includes a condition concerning a present time.

10. The robot system according to claim 1,
wherein the camera includes a first camera mounted in the robot body and configured to take an image in a frontward direction from the robot body, and a second camera mounted in the robot body and configured to take an image in a rearward direction from the robot body, and
wherein the running control unit controls the driving mechanism so that the robot body runs along the running route, on the basis of results of comparison between the teaching images stored in the teaching-image storage unit, and a first acquired image taken by the first camera and a second acquired image taken by the second camera.

11. The robot system according to claim 1,
wherein the teaching-image storage unit is configured to store a first teaching image acquired at a first separate teaching point of the plurality of separate teaching points under the first environmental lighting condition, and a second teaching image acquired at the first separate teaching point of the plurality of separate teaching points under the second environmental lighting condition,
wherein the teaching-image storage unit is configured to store a third teaching image acquired at a second separate teaching point of the plurality of separate teaching points under the first environmental lighting condition, and a fourth teaching image acquired at the second separate teaching point of the plurality of separate teaching points under the second environmental lighting condition, and
wherein the teaching-image selection unit configured to select the present teaching image from the first, second, third, and fourth teaching images stored in the teaching-image storage unit.

12. A robot system comprising:
a robot body configured to run along a running route;
a driving mechanism configured to drive the robot body in a front-rear direction and a turning direction;
a driving control device mounted in the robot body and configured to control the driving mechanism;
a first camera mounted in the robot body and configured to take an actual image in a frontward direction from the robot body; and
a second camera mounted in the robot body and configured to take an actual image in a rearward direction from the robot body,
wherein the driving control device includes:
a teaching-image storage unit configured to store teaching images including image data acquired beforehand along the running route at a plurality of separate teaching points on the running route; and
a running control unit configured to control the driving mechanism so that the robot body runs along the running route, on the basis of results of comparison between the teaching images stored in the teaching-image storage unit, and both a first acquired image taken by the first camera and a second acquired image taken by the second camera.

13. The robot system according to claim 12, wherein the first camera and the second camera are arranged in a manner such as to be opposite in an image-taking direction.

14. The robot system according to claim 12,
wherein the teaching-image storage unit stores teaching images for the first camera and teaching images for the second camera, and
wherein the running control unit controls the driving mechanism on the basis of a result of comparison between the first acquired image and the teaching images for the first camera and a result of comparison between the second acquired image and the teaching images for the second camera.

15. The robot system according to claim 12,
wherein the first camera is provided parallel to and offset from a center axis of the robot body, and
wherein the second camera is point-symmetrical with the first camera about a turning center of the robot body.

16. The robot system according to claim 12, wherein the first acquired image and the second acquired image used by the running control unit to control the driving mechanism are both acquired when the robot body is at a same location along the running route.

* * * * *